United States Patent
Kalampoukas et al.

(10) Patent No.: US 9,590,755 B2
(45) Date of Patent: Mar. 7, 2017

(54) EFFICIENT APPARATUS AND METHOD FOR AUDIO SIGNATURE GENERATION USING AUDIO THRESHOLD

(71) Applicant: Alphonso Inc., Brick, NJ (US)

(72) Inventors: Lampros Kalampoukas, Brick, NJ (US); Daniel C. Sun, Bedminster, NJ (US)

(73) Assignee: Alphonso Inc., San Carlos, CA (US)

( * ) Notice: Subject to any disclaimer, the term of this patent is extended or adjusted under 35 U.S.C. 154(b) by 0 days.

(21) Appl. No.: 14/713,980

(22) Filed: May 15, 2015

(65) Prior Publication Data

US 2015/0331660 A1     Nov. 19, 2015

Related U.S. Application Data

(60) Provisional application No. 61/994,810, filed on May 16, 2014, provisional application No. 61/994,799, (Continued)

(51) Int. Cl.
   *G06F 17/00*     (2006.01)
   *H04H 60/58*    (2008.01)
   (Continued)

(52) U.S. Cl.
   CPC ............. *H04H 60/58* (2013.01); *G06F 3/165* (2013.01); *G06F 17/30743* (2013.01);
   (Continued)

(58) Field of Classification Search
   CPC ......... G06F 17/30743; G06F 17/30876; G10L 19/018; G10L 25/48; G10L 25/51; H04H 60/52; H04H 60/58
   See application file for complete search history.

(56) References Cited

U.S. PATENT DOCUMENTS

| | | |
|---|---|---|
| 4,677,466 A | 6/1987 | Lert, Jr. et al. |
| 4,697,209 A | 9/1987 | Kiewit et al. |

(Continued)

FOREIGN PATENT DOCUMENTS

| | | |
|---|---|---|
| EP | 2501144 A2 | 9/2012 |
| EP | 2501145 A2 | 9/2012 |
| EP | 2501146 A2 | 9/2012 |

OTHER PUBLICATIONS

Apple iPhone 3G Specification 2008.
(Continued)

*Primary Examiner* — Fan Tsang
*Assistant Examiner* — David Siegel
(74) *Attorney, Agent, or Firm* — Panitch Schwarze Belisario & Nadel LLP

(57) ABSTRACT

An automatic content recognition system that includes a user device for the purpose of capturing audio and generating an audio signature. The user device may be a smartphone or tablet. The system is also capable of determining sound level at a user device and refraining from audio monitoring and/or generating audio signatures when the sound level is below a threshold. Sound level may also be used to reduce the frequency of audio monitoring and/or signature generation. The system may have a database within the user device or the user device may communicate with a server having a database that contains reference audio signatures.

10 Claims, 4 Drawing Sheets

Related U.S. Application Data filed on May 16, 2014, provisional application No. 61/994,634, filed on May 16, 2014, provisional application No. 61/994,805, filed on May 16, 2014, provisional application No. 61/994,812, filed on May 16, 2014.

(51) Int. Cl.

| | | |
|---|---|---|
| *G10L 15/06* | (2013.01) | |
| *G10L 19/018* | (2013.01) | |
| *G06F 3/16* | (2006.01) | |
| *G06F 17/30* | (2006.01) | |
| *H04R 29/00* | (2006.01) | |
| *G10L 25/27* | (2013.01) | |
| *G10L 25/03* | (2013.01) | |
| *G10L 25/51* | (2013.01) | |
| *G10L 25/48* | (2013.01) | |
| *G10L 25/18* | (2013.01) | |

(52) U.S. Cl.
CPC .. *G06F 17/30864* (2013.01); *G06F 17/30876* (2013.01); *G10L 15/06* (2013.01); *G10L 19/018* (2013.01); *G10L 25/03* (2013.01); *G10L 25/18* (2013.01); *G10L 25/27* (2013.01); *G10L 25/48* (2013.01); *G10L 25/51* (2013.01); *H04R 29/004* (2013.01)

(56) References Cited

U.S. PATENT DOCUMENTS

| | | | |
|---|---|---|---|
| 5,351,075 | A | 9/1994 | Herz et al. |
| 5,659,653 | A | 8/1997 | Diehl et al. |
| 5,802,488 | A | 9/1998 | Edatsune |
| 6,771,885 | B1 | 8/2004 | Agnihotri et al. |
| 6,856,758 | B2 | 2/2005 | Iggulden |
| 7,003,213 | B1 | 2/2006 | Hasegawa |
| 7,013,301 | B2 | 3/2006 | Holm et al. |
| 7,443,807 | B2 | 10/2008 | Cutler |
| 7,565,104 | B1 | 7/2009 | Brown et al. |
| 8,280,772 | B2 | 10/2012 | Fish |
| 8,453,170 | B2 | 5/2013 | Briggs et al. |
| 8,468,357 | B2 | 6/2013 | Roberts et al. |
| 9,094,453 | B2 | 7/2015 | Ady et al. |
| 9,332,522 | B2 | 5/2016 | Corbellini et al. |
| 2002/0072982 | A1 | 6/2002 | Barton et al. |
| 2002/0083060 | A1 | 6/2002 | Wang et al. |
| 2002/0099555 | A1 | 7/2002 | Pitman et al. |
| 2003/0039464 | A1 | 2/2003 | Davis et al. |
| 2003/0086341 | A1 | 5/2003 | Wells et al. |
| 2003/0088871 | A1 | 5/2003 | Kimura |
| 2005/0208913 | A1 | 9/2005 | Raisinghani |
| 2006/0064721 | A1 | 3/2006 | Del Val et al. |
| 2007/0050832 | A1 | 3/2007 | Wright et al. |
| 2007/0143777 | A1 | 6/2007 | Wang |
| 2007/0183415 | A1 | 8/2007 | Fischer et al. |
| 2007/0183743 | A1 | 8/2007 | Tanikawa et al. |
| 2010/0142715 | A1* | 6/2010 | Goldstein ......... G06F 17/30743 381/56 |
| 2010/0226526 | A1 | 9/2010 | Modro et al. |
| 2010/0238304 | A1 | 9/2010 | Miyata |
| 2011/0022633 | A1 | 1/2011 | Bernosky et al. |
| 2011/0085781 | A1 | 4/2011 | Olson |
| 2011/0087490 | A1 | 4/2011 | Olson |
| 2011/0289114 | A1 | 11/2011 | Yu et al. |
| 2011/0320202 | A1 | 12/2011 | Kaufman |
| 2012/0029670 | A1 | 2/2012 | Mont-Reynaud et al. |
| 2012/0059495 | A1* | 3/2012 | Weiss ............... G06F 17/30743 700/94 |
| 2012/0184372 | A1 | 7/2012 | Laarakkers et al. |
| 2012/0224711 | A1 | 9/2012 | Kim et al. |
| 2012/0265328 | A1 | 10/2012 | Kadirkamanathan et al. |
| 2013/0046542 | A1 | 2/2013 | Papakipos et al. |
| 2013/0071090 | A1 | 3/2013 | Berkowitz et al. |
| 2013/0103810 | A1 | 4/2013 | Papakipos et al. |
| 2013/0139209 | A1 | 5/2013 | Urrabazo |
| 2013/0202128 | A1 | 8/2013 | Jain et al. |
| 2013/0205318 | A1 | 8/2013 | Sinha et al. |
| 2013/0245986 | A1 | 9/2013 | Grokop et al. |
| 2013/0290502 | A1 | 10/2013 | Bilobrov et al. |
| 2013/0301706 | A1 | 11/2013 | Qiu |
| 2014/0046922 | A1 | 2/2014 | Crook |
| 2014/0249771 | A1 | 9/2014 | Yang et al. |
| 2014/0254801 | A1 | 9/2014 | Srinivasan |
| 2014/0282660 | A1 | 9/2014 | Oztaskent et al. |
| 2015/0104023 | A1 | 4/2015 | Bilobrov |
| 2015/0279381 | A1 | 10/2015 | Goesnar |
| 2015/0331660 | A1 | 11/2015 | Kalampoukas et al. |
| 2015/0331661 | A1 | 11/2015 | Kalampoukas et al. |
| 2015/0332669 | A1 | 11/2015 | Kalampoukas et al. |
| 2015/0332687 | A1 | 11/2015 | Kalampoukas et al. |

OTHER PUBLICATIONS

Zhao et al, "Audio Recording Location Identification Using Acoustic Environment Signature," IEEE Trans. Information Forensics and Security, vol. 8, No. 11, Nov. 2013.

Wikipedia Page ("Principles of Motion Sensing" archived Sep. 6, 2013, hereinafter, Wikipedia).

Cano, P., Batlle, E., Kalker, T., and Haitsma, J., A Review of Algorithms, 2002 IEEE Workshop on Multimedia Signal Processing, Sep. 11, 2002; IEEE, pp. 169-173, USA.

Burges, C., Platt, J., Goldstein, J., and Renshaw, E., Name That Tune: Stream Audio Fingerprinting, Microsoft Research, http://research.microsoft.com/en-us/um/people/cburges/rare.htm, 37 pages, USA.

iOS 7: Understanding Location Services, http://support.apple.com/en-us/HT201357, 2015, 4 pages, USA.

Baluja, S. and Covell, M., Content Fingerprinting Using Wavelets, Google, Inc., 2006 3rd European Conference on Visual Media Production, 2006, pp. 198-207, IET, USA.

Baluja, S., Covell, M., and Ioffe, S., Permutation Grouping: Intelligent Hash Function Design for Audio Image Retrieval, Google, Inc., 2008 IEEE International Conference on Acoustics, Speech and Signal Processing, 2008, pp. 2137-2140, IEEE, USA.

Wang, A.L., An Industrial-Strength Audio Search Algorithm, Shazam Entertainment, Ltd ISMIR 2003, 4th International Conference on Music Information Retrieval, 2003, USA, UK.

Haitsma, J. and Kalker, T., A Highly Robust Audio Fingerprinting System, Journal of New Music Research, 2003, pp. 211-221, India, UK.

Kekre, H.B., Bhandari, N., and Nair, N., A Review of Audio Fingerprinting and Comparison of Algorithms, International Journal of Computer Applications IJCA, vol. 70, No. 13, May 2013, pp. 24-30, USA.

Android Sensors Overview, Mar. 9, 2014, downloaded from web page: http://developer.android_com/guide/topics/sensors/sensor_overview.html, Downloaded date: Jul. 15, 2015, original posting date: unknown, 13 pages.

Office Action issued Jun. 16, 2016 in U.S. Appl. No. 14/713,960 by Kalampoukas.

Office Action issued Dec. 2, 2015 in U.S. Appl. No. 14/713,960 by Kalampoukas.

\* cited by examiner

EFFICIENT APPARATUS AND METHOD FOR AUDIO SIGNATURE GENERATION USING AUDIO THRESHOLD

CROSS REFERENCE TO RELATED APPLICATIONS

This application claims priority under 35 U.S.C. §119(e) to U.S. Provisional Application Ser. Nos. 61/994,810, 61/994,799, 61/994,634, 61/994,805, and 61/994,812, all filed on May 16, 2014, the entire contents of which are incorporated by reference.

BACKGROUND OF THE INVENTION

1. Field of the Invention

The invention relates to an efficient system for audio signature generation, and particularly a system and method for conserving power, communication and/or computational resources.

2. Description of the Related Technology

EP 2 501 145 A2 entitled, "Content Provision," is expressly incorporated by reference herein and shows an application where it is useful to identify the audio or video content being presented to a user.

US20130205318 A1 entitled, "Method and system for automatic content recognition based on customized user preferences," is expressly incorporated by reference herein and shows an automatic content recognition (ACR)-enabled connected TV device may be operable to identify, utilizing an ACR system, content in a presented program.

US20130071090 A1 entitled, "Automatic content recognition system and method for providing supplementary content," is expressly incorporated by reference herein and shows automatic content recognition performed to determine the primary digital content. The time of a sample may also be determined. Supplementary digital content is then selected and transmitted to the media device, or to another device, based upon the identified primary digital content. The supplementary digital content may be adapted in layout, type, length, or other manners, based upon the platform and/or configuration of the media device or any other device to which the supplementary digital content is transmitted.

US20110289114 A1 entitled "System and method for auto content recognition," is expressly incorporated by reference herein and shows automatically recognizing media contents by the steps of capturing media content from the Internet and/or devices, extracting fingerprints from captured content and transferring to backend servers for identification, and backend servers processing the fingerprints and replying with identified result.

SUMMARY OF THE INVENTION

According to an advantageous feature of the invention an audio signature may be used to characterize the audio at a location for automatic content recognition.

An audio signature is a digital summary, generated from audio and/or an audio signal, which can be used to identify an audio sample or quickly locate similar items in a database.

An audio fingerprint is a condensed digital summary, generated from audio and/or an audio signal, which can be used to identify an audio sample or quickly locate similar items in an audio database. As used herein, an audio fingerprint is a special form of audio signature.

Automatic content recognition (ACR) refers to the ability to identify a content element within the proximity of a probe or sensor, audio, video or image, based on sampling a portion of the audio, or video, or image, processing the sample and comparing it with a reference. Set forth below are description of an ACR system for determining time shift and an ACR system for determining co-location of devices. These two systems may be enhanced by efficiency and conservation of resources.

a. ACR System for Determining Time Shift

A system for automatic content recognition based on comparing an audio signature to a reference signature may include a receiver connected to one or more communication channels configured to receive a remote audio signature over the communication channel. A database may have one or more stored reference audio signatures with one or more timestamps stored in the database and associated with one or more of the reference audio signatures. A query engine may be associated with or connected to the database and may be configured to compare a remote audio signature to one or more reference audio signatures stored in the database. A processor may be responsive to the query engine and connected to the database wherein the processor may be configured or programmed to process the audio signatures for a desired purpose such as determination of a time offset as set forth in U.S. Provisional Patent Application 61/994,634, to the instant applicant; the disclosure of which is expressly incorporated herein; for identifying co-located devices as set forth in U.S. Provisional Patent Application 61/994,799, to the instant applicant; or for other purposes.

The remote audio signature may be an audio fingerprint and one or more of the reference audio signatures may be audio fingerprints. There may be a scheduler configured to schedule remote audio signature generation. The scheduler may be connected to the communication channel configured to transmit a request for a remote audio signature over the communication channel. The scheduler connected to the query engine may be configured or programmed to schedule comparison of a remote audio signature to a reference audio signature. The query engine may be responsive to the scheduler. The query engine may be configured or programmed to prioritize comparison of remote audio signatures received over the communication channel to reference audio signatures associated with reference audio signatures matched to remote audio signatures received previously. The reference timestamp may include at least a timestamp relative to an initial reference audio signature timestamp. The processor may be configured or programmed to indicate changes in offset between the offset of first remote audio signature and a reference audio signature matching the first remote audio and an offset of a subsequent remote audio signature and a reference audio signature matching the subsequent remote audio signature and a reference audio signature matching the first remote audio signature and an offset of a subsequent remote audio signature and a reference audio signature matching the subsequent remote audio signature when the reference audio signature matching the subsequent remote audio signature is associated with the reference audio signature matching the first remote audio signature.

In a process involving a method for determining time offset of an audio signature from a reference signature time stamp the steps may include comparing a remote audio signature to a reference audio signature associated with a time stamp, comparing a time associated with the remote audio signature to a time stamp associated with a reference audio signature that matches the remote audio signature, and reporting a differential between the time associated with the remote audio signature and a timestamp associated with a reference audio signature that matches the remote audio signature.

The remote audio signature may be an audio fingerprint and one or more of the reference audio signatures may be audio fingerprints. The method may include the step of scheduling a remote audio signature generation. The step of scheduling may include transmitting a request for remote audio signature over the communication channel. The method may include the step of scheduling a comparison of a remote audio signature to a reference audio signature.

The query engine may be responsive to the scheduler. The step of comparing may prioritize comparison of a remote audio signature received over the communication channel to reference audio signatures associated with reference audio signatures matched to remote audio signatures received previously. The reference timestamp may include at least a timestamp relative to an initial reference audio signature timestamp. The method may include the step of indicating offset between a reference timestamp and a remote timestamp. The step of indicating may include the step of indicating changes in offset between an offset of a first remote audio signature and a reference audio signature matching the first remote audio signature and an offset of a subsequent remote audio signature and a reference audio signature matching the subsequent remote audio signature when the reference audio signature matching the subsequent remote audio signature may be associated with the reference audio signature matching the first remote audio signature.

b. ACR System for Determining Co-Location of Devices

An apparatus for determining co-location of devices is another example of an application for automatic content recognition. Such a system may include a receiver connected to one or more communication channels configured or programmed to receive a remote audio signature and a remote device identification over a communication channel and a database. One or more remote audio signatures may be stored in the database. A remote device identification may be associated with an audio signature stored in the database. A query engine may be connected to the database configured or programmed to compare a remote audio signature stored in the database to a remote audio signature received over the communication channel. The apparatus may include a processor responsive to the query engine configured or programmed to report a remote device identification associated with one of the audio signatures when an audio signature received over the communication channel matches an audio signature stored in the database within a threshold confidence level. The processor may be configured or programmed to report a remote device identification associated with an audio signature received over the communication channel and a remote device identification associated with an audio signature stored in the database when the audio signatures match within a threshold confidence level.

A component of the audio signature may represent a remote device identification. The query engine may be configured or programmed to limit a query set of the database according to a specified parameter. The specified parameter may be a temporal parameter. The specified parameter may be based on location services. The specified parameter may require temporal and location services based proximity of the audio signature received over the communication channel and the audio signature stored in the database.

A database controller may be configured or programmed to remove expired audio signatures from a comparison set.

A database controller may be configured or programmed to limit matching queries to no more than a preset number of stored audio signatures. A database controller may be configured or programmed to delete audio signatures in the database after a predetermined time period.

A method for determining co-location of devices may include the steps of receiving a remote audio signature and remote device identification over the communication channel, comparing a remote audio signature stored in the database to a remote audio signature received over the communication channel, and reporting a remote device identification associated with one of the audio signatures when an audio signature received over the communication channel matches an audio signature stored in the database within a threshold confidence level.

The method may include the step of reporting a remote device identification associated with an audio signature received over the communication channel and a remote device identification associated with an audio signature stored in the database when the audio signatures match within a threshold confidence level. A component of the audio signature may represent a remote device identification. The method may include the step of limiting a query set of the database according to a specified parameter. The specified parameter may be a temporal parameter. The specified parameter may be based on location services. The specified parameter may require temporal and location services based proximity of the audio signature received over the communication channel and the audio signature stored in the database. The method may include the step of removing expired audio signatures from a comparison set. The method may include the step of limiting matching queries to no more than a preset number of stored audio signatures. The method may include the step of deleting audio signatures in the database after a predetermined time period.

An apparatus for generating an audio signature may include a processor, a microphone connected to the processor, an audio signal generator connected to the processor and configured or programmed to generate an audio signal indicative of the apparatus, a speaker responsive to the audio signal generator, an audio signature generator connected to the processor and responsive to the microphone, and a transmitter connected to the processor capable of transmitting an audio signature to a communications channel.

The audio signal generator may be configured or programmed to generate an inaudible audio signal. The audio signal generator may be an audio identification signal generator.

A method for generating an audio signature may include the steps of generating an audio signal indicative of a user device, outputting the audio signal indicative of a user device through a speaker, using a microphone to sense audio, generating an audio signature of the audio sensed by the microphone, and transmitting the audio signature to a communication channel. The step of generating may generate an inaudible audio signal. The step of generating may generate an inaudible audio signal which may be an audio identification signal.

c. Enhanced Efficiency

The efficiency of automatic content recognition systems as it relates to use of resources can be enhanced by controlling operation in a way that takes advantage of conditions that suggest that fewer resources are required to operate the ACR application. The afore described ACR systems may be operated in a more efficient manner by reducing the resources used under conditions that suggest that the user device is in a quiet location. For example, a remote device uses power and computational resources to generate audio signatures and audio fingerprints, power, computational resources and communications resources are used to transmit audio signatures and/or audio fingerprints to a server and communication, power and computational resources are utilized to receive audio signatures and/or audio fingerprints at a server for further processing.

In certain applications it is desirable to conserve resources. For example monitoring, processing, and audio signature and/or audio fingerprint generation require battery power, which may be limited in a handheld or portable device, require capacity of the processors and other components of a portable device, which may be limited and require communications resources to transmit audio signatures and fingerprints. Device power may be limited in terms of battery capacity. Processor and other component capacity may be limited in a portable device. Communications resources may be limited in terms of capacity of transmission components and transmission channels of a remote device and cost of transmission of data.

A content recognition system that uses a microphone on a mobile user device will continuously listen for ambient audio and attempt to identify content when it is in an always on mode. Battery usage may be reduced by changing the operation characteristics of the device along with reduction of network activity and reduce in computational complexity upon evaluating sound level at the device.

The content recognition system on a user device may be put in a "sleep mode" where the device does not listen to the microphone and does not perform any content recognition computation if the audio level detected by the device is below a useful threshold.

In the case of a user device that is a smartphone or tablet such as an iOS or Android based device, audio information may be detected using a microphone built in to the device or connected thereto. The microphone may be "always-on" or may be activated under control of software in the device.

In addition, audio may be sampled continuously or under a schedule controlled by the device processor(s). Sampling may be performed on-demand, ad hoc or periodically. Another operation of the contemplated ACR system is the generation of audio signatures from sampled audio. There are various ways to control the operation of the audio signature generation. Audio signature may be generated when audio samples are provided or may be on a more limited basis under the device control. Once an audio signature is generated, it may be compared to a reference for recognition locally or transmitted to another device for content recognition.

The resources involved in any and all of the foregoing operations may be conserved by reducing the frequency of such operation or deferring performance of such operations under certain circumstances.

One such circumstance is upon detection of conditions that suggest the user device is in a quiet area.

It may be one object of the invention to conserve resources associated with automatic content recognition systems.

It may be another object to conserve resources in audio signature generation.

It may be another object of the invention to conserve communication resources in systems for automatic content recognition.

It may be another object of the invention to conserve computational resources in systems for automatic content recognition.

It may be another object of the invention to conserve power resources in a device that generates audio signatures or audio fingerprints.

It may be another object of the invention to conserve communication resources in a device that generates audio signatures and/or audio fingerprints; in a server connected to such device and/or in the communication channel between such a device and such a server.

It may be a further object of the invention to conserve processing resources in a device that generates audio signatures and/or audio fingerprints and/or a server connected to such a device.

The invention may involve refraining from monitoring audio, refraining from generating audio signatures and/or audio fingerprints, interrupting such operations and/or reducing the frequency of such operations under the conditions that a device detects insufficient audio levels. The same condition may be cause to interrupt processing or communication audio signatures. The interruption or reduction of frequency of one or more of these operations conserves use of resources by the user device. The conservation of resources when sound levels are low is useful in automatic content recognition systems that can tolerate ignoring audio when the user device is in a quiet area.

For example, a situation may arise where a remote user device, such as a smart phone, is in an area with no useful audio. This situation might occur when a user is asleep or leaves the device unattended, particularly when it is in a quiet area. While the ambient sound level is below a threshold, it is possible that the user is not consuming audio content. A low sound level is less likely to be indicative of consumption than if the device were in the presence of higher sound levels. This presents the opportunity to conserve resources and substantially maintain performance by not generating audio signatures or fingerprints or perform other operation requiring resources while the device detects a sound level below a certain level. The sound level may be determined by examining the entire detected frequency range or by examining limited frequencies.

By not generating audio signatures or fingerprints, the device conserves the power attendant to such generation, the processing resources to generate the audio signature or fingerprint and the processing resources of the server that receives and processes the audio signature or fingerprint, and the communication resources of the device transmitting, the server receiving, and the channel carrying the audio signature or fingerprint.

Various components may be used to detect sound level. For example a microphone or vibration detector may be used as a sensor for the determination.

The method of monitoring audio information may have the steps of capturing audio information, determining if the sound level is below a threshold, generating an audio signature from captured audio information, and inhibiting generation of an audio signature based on the result of the sound level detection. The step of inhibiting may be refraining from capturing the audio information or deferring a scheduled audio capture and/or audio signature generation. The step of imposing a delay in scheduling generation of audio signatures in response to a determination that a device is exposed to a low sound level. The frequency of capturing audio information may be reduced when the sound level is below a threshold. The frequency of audio signature generation may be reduced when the sound level is below a threshold.

The invention may include an article of manufacture, a method, a system, and an apparatus for generating an audio signature or audio fingerprint.

The article of manufacture of the invention may include a computer-readable medium comprising software for a system for generating an audio signature or audio fingerprints. The invention may be embodied in hardware and/or software and may be implemented in one or more of a general purpose computer, a special purpose computer, a mobile device, or other dedicated or multipurpose device.

The article of manufacture of the invention may include a computer-readable medium comprising software for an automatic content recognition system, comprising code segments for generating audio signatures.

The system of the invention may include a computer system including a computer-readable medium having software to operate a computer or other device in accordance with the invention.

The article of manufacture of the invention may include a computer-readable medium having software to operate a computer in accordance with the invention.

Various objects, features, aspects, and advantages of the present invention will become more apparent from the following detailed description of preferred embodiments of the invention, along with the accompanying drawings in which like numerals represent like components.

Moreover, the above objects and advantages of the invention are illustrative, and not exhaustive, of those that can be achieved by the invention. Thus, these and other objects and advantages of the invention will be apparent from the description herein, both as embodied herein and as modified in view of any variations which will be apparent to those skilled in the art.

DETAILED DESCRIPTION OF THE PREFERRED EMBODIMENT

Figure 1:
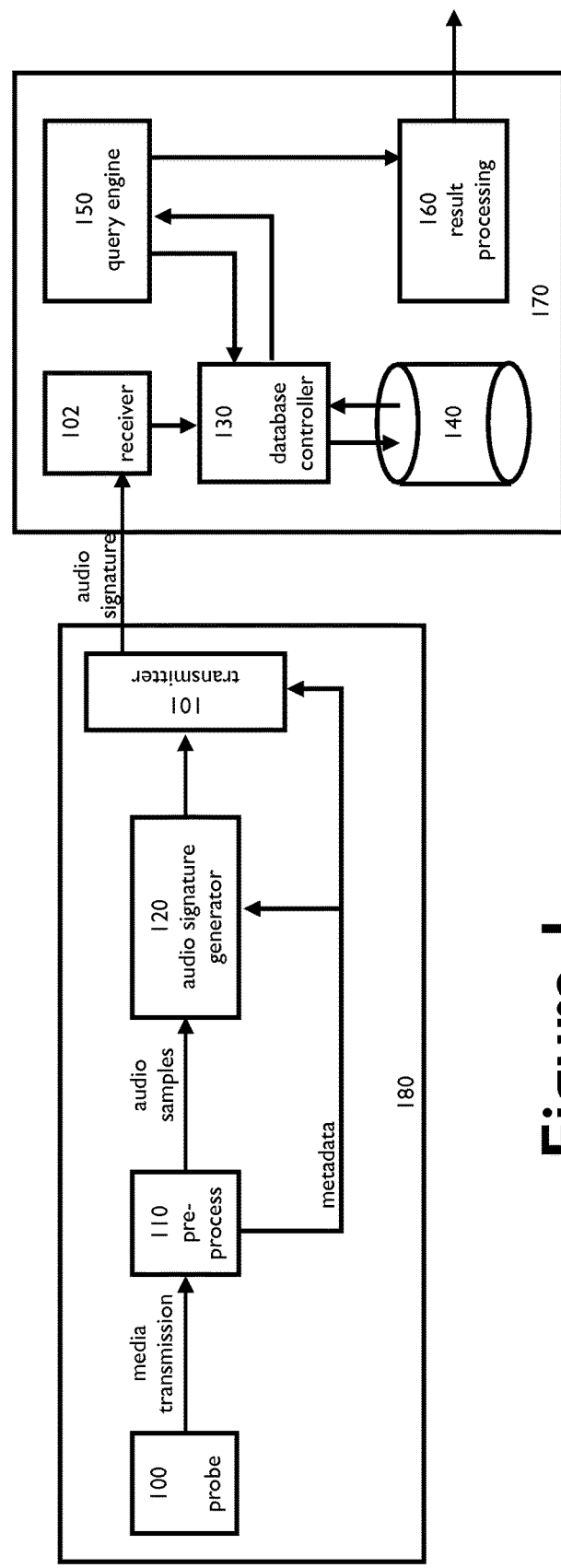
FIG. 1 shows a schematic of a device used in an automatic content recognition system.

Before the present invention is described in further detail, it is to be understood that the invention is not limited to the particular embodiments described, as such may, of course, vary. It is also to be understood that the terminology used herein is for the purpose of describing particular embodiments only, and is not intended to be limiting, since the scope of the present invention will be limited only by the appended claims.

Where a range of values is provided, it is understood that each intervening value, to the tenth of the unit of the lower limit unless the context clearly dictates otherwise, between the upper and lower limit of that range and any other stated or intervening value in that stated range is encompassed within the invention. The upper and lower limits of these smaller ranges may independently be included in the smaller ranges is also encompassed within the invention, subject to any specifically excluded limit in the stated range. Where the stated range includes one or both of the limits, ranges excluding either or both of those included limits are also included in the invention.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, a limited number of the exemplary methods and materials are described herein.

It must be noted that as used herein and in the appended claims, the singular forms "a", "an", and "the" include plural referents unless the context clearly dictates otherwise.

All publications mentioned herein are incorporated herein by reference to disclose and describe the methods and/or materials in connection with which the publications are cited. The publications discussed herein are provided solely for their disclosure prior to the filing date of the present application. Nothing herein is to be construed as an admission that the present invention is not entitled to antedate such publication by virtue of prior invention. Further, the dates of publication provided may be different from the actual publication dates, which may need to be independently confirmed.

The system may rely on automatic content recognition technology. One example of the use of automatic content recognition technology is the identification of audio. Automatic content recognition technology can be used to identify media content. Media content can be delivered according to a predetermined schedule. For example, cable or network broadcast stations "play" shows according to a schedule. The shows may include portions which are the episodes, referred to as principle content, and supplemental content such as commercials, emergency alerts and/or news interruptions. The content may be audio and visual, visual only, or audio only. The embodiments of the invention are described in terms of using audio as a representation of audio visual content, but the invention is equally applicable to audio only or video only content. Furthermore the embodiments of the invention are described in the context of sampling audio and generating audio signatures or fingerprints, but is equally applicable to sampling visual content, including video or images, and generating signatures or fingerprints based on the visual samples.

Viewers of scheduled content may, and traditionally have, viewed television content live according to the broadcast schedule of the distributor, such as a network, television station or cable distributor.

Digital video recording services and on-demand content delivery services have become virtually ubiquitous in many households and may take the form of a physical device, a content provider network based service, or a cloud-based service. These video recorders allow viewers to pause streamed broadcasts, rewind or record programming for later playback. The recorders also allow viewers to fast forward and, in some cases, skip content.

Automatic content recognition may be utilized to identify audio or video content being presented to a user. Automatic content recognition may be used to determine time shift in the consumption of audio and/or visual media content.

FIG. 1 shows a schematic of a system for automatic content recognition. FIG. 1 shows a remote user device 180 which may be associated with an individual. The remote user device 180 may be a device used to collect or process audio information. The remote user device 180 may be a smart phone, tablet or other device.

FIG. 1 shows a remote user device 180 having a probe 100 which may be used to collect information for use in automatic content recognition. The information may include audio information and other information that is metadata related to the collected audio or associated with the remote user device or user. The probe may comprise more than one component depending on what components would be useful to collect the information. The probe may include a microphone, clock or time stamp generator, camera, GPS sensor or other elements for location services or temperature sensor and may have access to other device information such as user identification, serial number and MAC address, and time.

The probe may be embodied in a smartphone or tablet which may be associated with a user. The probe may utilize an internal clock or a network accessible clock to generate a time stamp. Smartphone devices provide ready access to location services and other parameters which are known or derived by the probe device or accessed over a communications channel. Apple Support Note HT5594, the content of which is incorporated herein, accessible at http://support.apple.com/kbHT5594, describes location services available to an iOS device.

The information may be processed in order to format and segregate the information. Formatted data representative of an audio or video presentation may be processed by pre-processor 110. The pre-processor advantageously is running on the same device as the probe and may be in the form of an app on a smartphone or tablet or distributed in the form of a library that can be embedded in other apps. The pre-processor may be a component of an app running on a user's smartphone or tablet. For example, the pre-processor may control audio sampling to collect digital information representative of audio.

The remote user device may capture audio information using a component to "listen" to audio being played or present in the location of the remote user device 180. Capturing may be accomplished by audio sampling. The audio samples may be transmitted to a server as captured, or an audio signature may be generated which may then be transmitted to a server location. The audio signature may be an audio fingerprint and may include metadata.

The remote user device need not be in the same location as a server. The remote user device 180 may be a cellphone or a tablet device. Smartphones such as an iPhone or Android-based device may serve as the remote user device.

The server may operate to correlate the audio information received from many remote user devices and reference information stored in a database to identify or characterize the audio information. The reference may include audio signatures or audio fingerprints and metadata for one or more streams of audio and/or visual programming, and may include identification of content and content class, such as principle content or supplemental content.

This information may be useful for many purposes including, without limitation, to feed supplemental media to a user or user device, to price audio content delivery, for analytic or other purposes.

FIG. 1 shows a diagram of an automatic content recognition ("ACR") system. Automatic content recognition can be used in many applications where it is desirable to identify audio information.

The pre-processor may pass the formatted audio samples to an audio signature generation unit. There are a number of ways to generate an audio signature. For example, U.S. Pat. No. 8,468,357 entitled, "Multiple Step Identification of Recordings" is expressly incorporated herein by reference, discloses a method and system where algorithmically-determined fingerprints are extracted from audio information utilizing one or more fingerprint extraction methods. An audio fingerprint may be used as an audio signature. The fingerprint may be less unique than an uncompressed signature, but has the benefit of conserving transmission bandwidth and computational resources used for comparison to a reference data-set.

U.S. Pat. No. 8,453,170 B2 entitled, "System and method for monitoring and recognizing broadcast data," is expressly incorporated by reference herein and shows an automatic content recognition (ACR) system.

The audio signature generation 120 may be advantageously executed on the same device as the probe 100 and the pre-processor 110. Advantageously that device is a user's cellphone, smartphone or tablet. The audio signature created by audio signature generator 120 and the metadata segregated by pre-processor 110, if any, may be combined and transmitted by transmitter 101 to a server 170. A time stamp may be associated with the audio signature by the remote user device 180. Alternatively, a times stamp may be associated with an audio signature by the server 170 upon receipt of the signature.

The server may include a receiver 102 to receive an audio signature and a database controller 130. The receiver receives audio signatures and any metadata associated with the audio signatures that is transmitted by a remote user device 180. The receiver 102 may associate a time stamp with an audio signature. The database controller 130 may advantageously format the audio signature and associated metadata, if any, for storage in a database 140. The database controller 130 may also inform a query engine 150 of the signature or the signature received from a user device 180 ("query audio signature") and metadata. The query engine 150 can advantageously access the database 140 in order to find reference signature(s) corresponding to the query audio signature from a remote user device 180 which resulted in the signature. When an audio signature is matched, some or all of the metadata and or audio signature may be passed to a result processing module 160 which is able to make use of the identification of the content and metadata.

The database 140 may contain reference audio signatures. The audio signature received from a remote user device 180 may be used to query the database 140. The reference audio signatures may be audio fingerprints. The metadata may include information identifying the content corresponding to the audio signature, distribution time and locations, and/or any other useful metadata.

EP 2 501 145 A2 is expressly incorporated by reference herein and shows that the identification of the content may be utilized to serve supplemental content to a user. The result processing system 160 may, for example, be a content augmentation service.

The remote user device 180, as previously discussed, may be utilized to monitor audio information at a user location. A device 180 may also be provided to monitor reference content and generate reference audio fingerprints and audio signatures with metadata which may be passed to the database controller 130 and stored in database 140 as a reference. The metadata may be a time stamp, an indication of the identification of the reference content or an indication of the device that captures the content. If the audio signature derived at a user device 180 matches a reference audio signature stored in the database, with an acceptable level of confidence, then the server 170 may use the metadata associated with the reference audio signature and/or associated with the captured device audio signature or derive the identification of the media content monitored by the remote user device 180.

Figure 2:
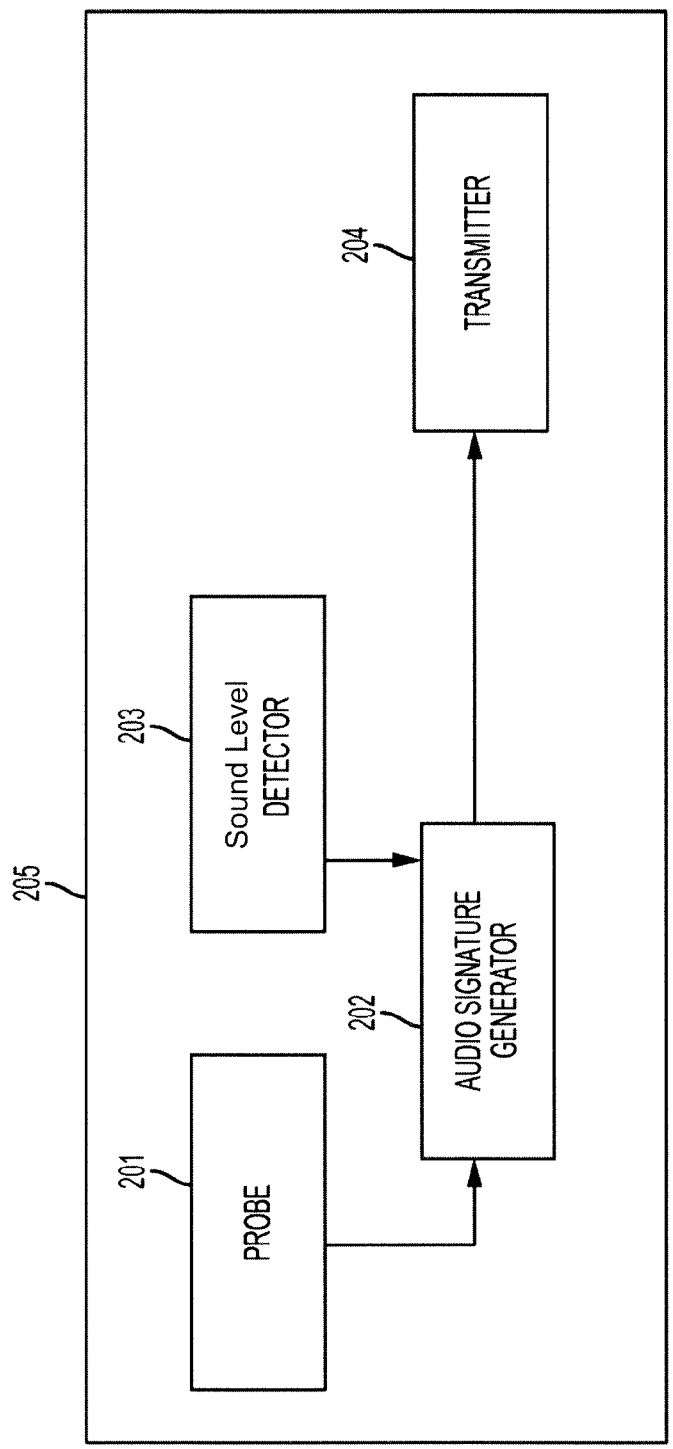
FIG. 2 shows a schematic of an efficient device used in an automatic content recognition system.

FIG. 2 shows an example of an embodiment of an efficient user device that monitors ambient audio for automatic content recognition.

A probe may collect audio and/or video information. As described in connection with FIG. 1, the probe may be embodied in a remote user device such as a smart phone, tablet, or other computing device.

The mobile user device 205 may include a mobile audio signature generation module 202. The mobile audio signature generation module 202 may generate an audio signature from ambient audio in response to sampling the audio by probe 201, pre-processing the audio, collecting metadata by probe 201, and generating an audio signature. According to an additional feature the audio signature may be condensed to an audio signature that is an audio fingerprint. The probe 201 may acquire metadata such as time stamp and device identification.

In some applications, the mobile user device 205 may not need to monitor audio information when the remote user device is in a quiet location. This presents an opportunity to conserve power, computational resources, and communications resources. The elements of the ACR system may benefit by conservation of such resources. The conservation of power may extend the time between device recharging. Conservation of processing resources may permit increased performance of other processes carried out by the user device. Conservation of communications resources may reduce the bandwidth required by the components of the system and the expense of communicated data volume. These benefits may be achieved by a device that does not generate and transmit audio signatures or does so at a reduced frequency when it is in a quiet location.

The device shown in FIG. 2 includes probe components 201. The probe will include a microphone for converting audio information to an electrical signal. The probe may also collect other information such as timestamp, location services, etc. The electrical signal representative audio information is provided to an audio signature generator 202. The audio signature generator 202 may be responsive to a sound level detector 203. The sound level detector 203 may be a component that detects sound levels or sound levels in a limited frequency range which may be utilized to recognize conditions suggesting absences of audio of interest to the ACR application. Advantageously the audio signature generator 202 will only generate an audio signature when the user device detects sound levels above a threshold level Transmitter 204 receives audio signatures from the audio signature generator 202 and can transmit the audio signatures over a communications channel. This system is particularly useful when the remote user device 205 is a mobile device such as a smartphone or tablet.

Figure 3:
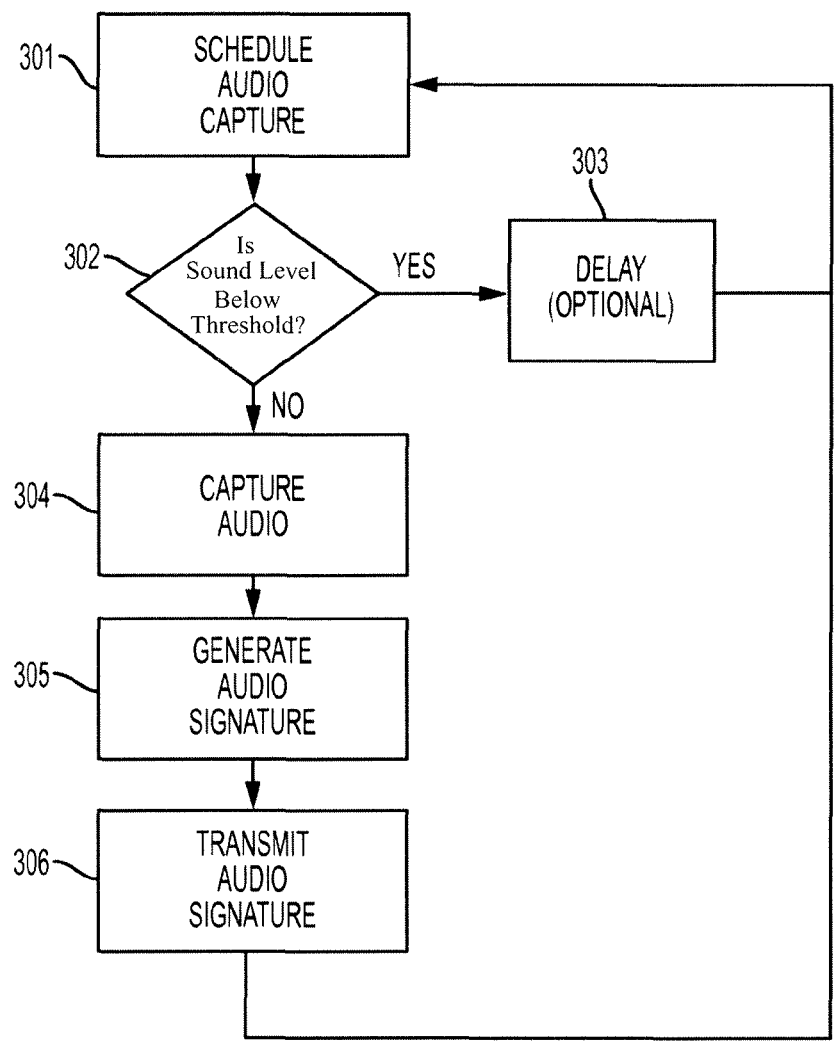
FIG. 3 and FIG. 4 show process flow diagrams of efficient embodiments for use in an automatic content recognition system.

FIG. 3 shows a method according to an embodiment of the invention. The remote user device 205 may capture audio and generate audio signatures for transmission on its own schedule. Process 301 serves to schedule audio capture. Process 302 may rely on input from sound level detector 203. In the event the sound level is below a certain level, the methods may refrain from audio signature generation and even capturing the audio or reduce the frequency thereof.

It is possible to increase efficiency even further by imposing a delay before scheduling an audio capture. Once it is determined that ambient sound levels are below a desired level, the device may wait longer than usual between sampling operations. A delay process 303 may increase efficiency when a device is exposed to low sound levels.

If process 302 determines that the sound level is at or above a threshold level, process 304 will capture audio information and process 305 will utilize the captured audio information to generate an audio signature. Process 306 may operate to transmit the audio signature to a server over a communications channel.

Figure 4:
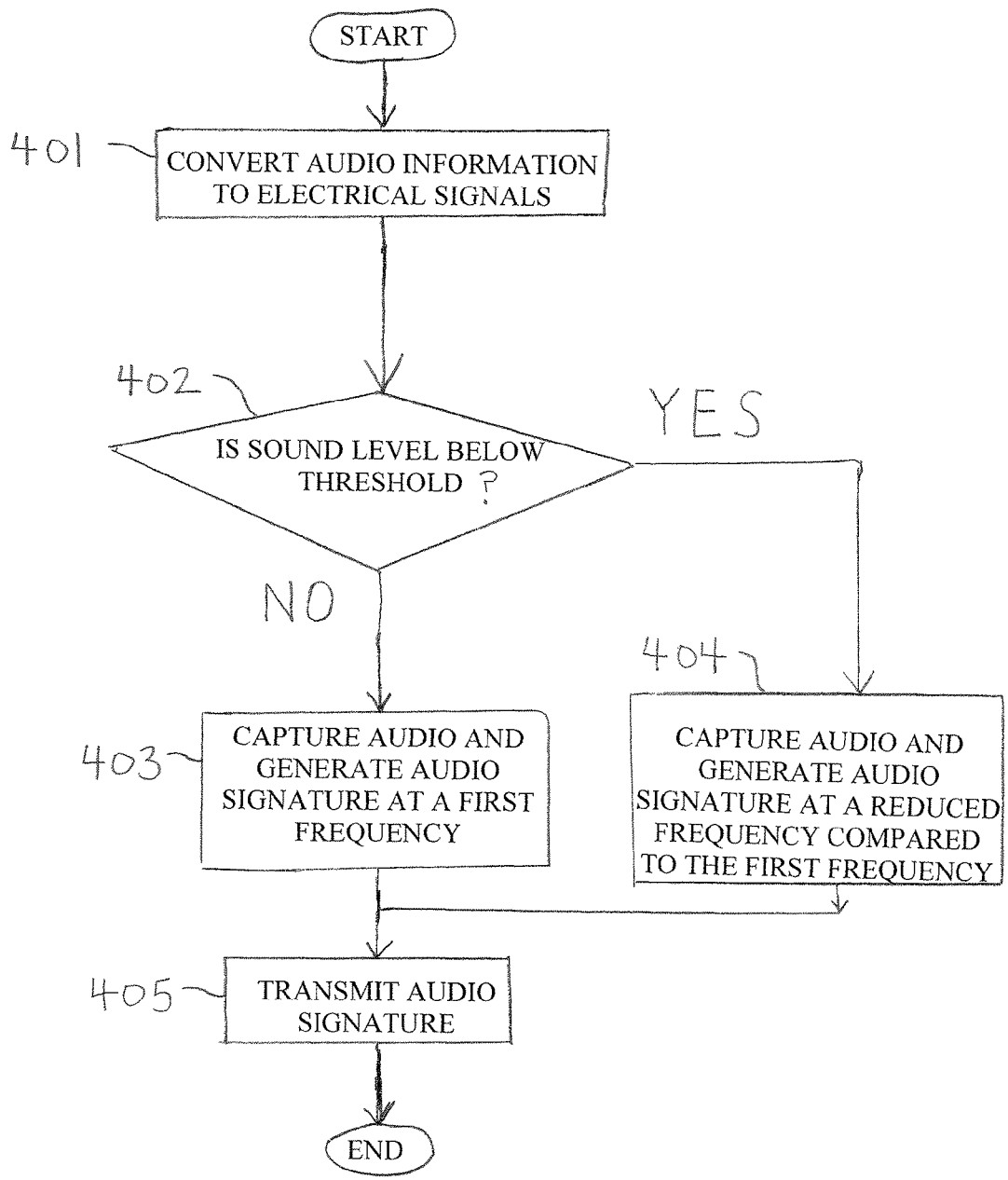

FIG. 4 shows a method according to another embodiment of the invention, and includes the following steps:

401: Convert audio information to electrical signals.
402: Determine if the sound level is below a threshold
403: If not, capture the audio and generate audio signatures at a first frequency.
404: If so, capture the audio and generate audio signatures at a reduced frequency compared to the first frequency.
405: Transmit the audio signatures.

The invention is described in detail with respect to preferred embodiments, and it will now be apparent from the foregoing to those skilled in the art that changes and modifications may be made without departing from the invention in its broader aspects, and the invention, therefore, as defined in the claims, is intended to cover all such changes and modifications that fall within the true spirit of the invention.

Thus, specific apparatus for and methods of audio signature generation and automatic content recognition have been disclosed. It should be apparent, however, to those skilled in the art that many more modifications besides those already described are possible without departing from the inventive concepts herein. The inventive subject matter, therefore, is not to be restricted except in the spirit of the disclosure. Moreover, in interpreting the disclosure, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

What is claimed is:

1. An apparatus for monitoring audio information comprising:
   a probe component to convert audio information to an electrical signal;
   a sound level detector;
   an audio signature generator responsive to said probe component and said sound level detector configured to generate an audio signature at a first frequency when the sound level is at or above a threshold and to generate an audio signature at a reduced frequency compared to the first frequency when the sound level is below a threshold;
   a transmitter responsive to said audio signature generator that transmits any generated audio signature over a communication channel to a remote server for potential identification of the content represented by the audio signature.

2. An apparatus according to claim 1 wherein said probe component comprises a microphone.

3. An apparatus according to claim 1 wherein said sound level detector is frequency based.

4. An apparatus according to claim 1 further comprising a time delay element associated with said sound level detector.

5. A method for monitoring audio information comprising the steps of:
   capturing audio information using a probe component that converts audio information to an electrical signal;
   determining sound level using a sound level detector;

generating an audio signature, using an audio signature generator responsive to the probe component and the sound level detector, from the captured audio information at a first frequency when the determined sound level is at or above a threshold and generating an audio signature at a reduced frequency compared to the first frequency when the determined sound level is below a threshold; and transmitting any generated audio signature over a communication channel to a remote server for potential identification of the content represented by the audio signature.

6. A method according to claim 5 further comprising the step of scheduling the audio signature generation.

7. A method according to claim 5 wherein said step of determining sound level comprises the steps of determining sound level in a limited frequency range.

8. A method according to claim 5 further comprising the step of scheduling an audio capture.

9. An apparatus according to claim 1 wherein the audio signature is an audio fingerprint.

10. A method according to claim 5 wherein the audio signature is an audio fingerprint.

* * * * *